US008981715B2

(12) United States Patent
Ichikawa et al.

(10) Patent No.: US 8,981,715 B2
(45) Date of Patent: Mar. 17, 2015

(54) CHARGING CABLE FOR ELECTRIC VEHICLE AND METHOD OF CONTROLLING CHARGING CABLE USING DETERMINATION OF A CHARGING CABLE USAGE HISTORY

(75) Inventors: Shinji Ichikawa, Toyota (JP); Shigeo Mori, Makinohara (JP); Takashi Tsukamoto, Makinohara (JP)

(73) Assignees: Toyota Jidosha Kabushiki Kaisha, Toyota (JP); Yazaki Corporation, Tokyo (JP)

( * ) Notice: Subject to any disclaimer, the term of this patent is extended or adjusted under 35 U.S.C. 154(b) by 815 days.

(21) Appl. No.: 13/129,194

(22) PCT Filed: Nov. 17, 2009

(86) PCT No.: PCT/IB2009/007480
§ 371 (c)(1),
(2), (4) Date: Jun. 20, 2011

(87) PCT Pub. No.: WO2010/055411
PCT Pub. Date: May 20, 2010

(65) Prior Publication Data
US 2012/0007553 A1    Jan. 12, 2012

(30) Foreign Application Priority Data

Nov. 17, 2008   (JP) .................................. 2008-293494

(51) Int. Cl.
*H02J 7/00*      (2006.01)
*G07C 5/08*     (2006.01)
*B60L 11/18*    (2006.01)

(52) U.S. Cl.
CPC ............. *G07C 5/085* (2013.01); *B60L 11/1838* (2013.01); *B60L 11/1816* (2013.01);
CPC ......... *B60L11/1824* (2013.01); *B60L 2220/14* (2013.01); *B60L 2230/12* (2013.01); *Y02T 10/7005* (2013.01); *Y02T 10/7088* (2013.01); *Y02T 90/121* (2013.01); *Y02T 90/14* (2013.01)
USPC ........... 320/109; 439/488; 439/489; 439/491; 340/653; 340/654; 340/656

(58) Field of Classification Search
CPC .......................... B60L 11/1824; B60L 11/1838
USPC ........... 320/109; 439/488–491; 340/635, 653, 340/654, 656, 691.6
See application file for complete search history.

(56) References Cited

U.S. PATENT DOCUMENTS

| 5,400,267 | A | * | 3/1995 | Denen et al. ..................... 702/59 |
| 5,926,004 | A | * | 7/1999 | Henze ............................ 320/109 |
| 6,483,272 | B1 | | 11/2002 | Terada et al. |
| 7,366,584 | B2 | * | 4/2008 | Brodin et al. ................. 700/168 |
| 2008/0304613 | A1 | * | 12/2008 | Yuan et al. ...................... 377/16 |
| 2010/0010698 | A1 | | 1/2010 | Iwashita et al. |

FOREIGN PATENT DOCUMENTS

| CN | 1291367 A | 4/2001 |
| EP | 1 050 944 A1 | 11/2000 |
| JP | A-50-043491 | 4/1975 |
| JP | A-07-029639 | 1/1995 |
| JP | A-11-162570 | 6/1999 |
| JP | A-2008-252986 | 10/2008 |
| WO | WO 2004/081881 A1 | 9/2004 |
| WO | WO 2008/015893 A1 | 2/2008 |

OTHER PUBLICATIONS

Standards of SAEJ1772, Surface Vehicle Recommended Practice, SAE Electric Vehicle Conductive Charge Coupler, 1996, pp. 1-32.
Japanese Office Action in Japanese Patent Application No. 2008-293494; dated Aug. 24, 2010 (with partial English-language translation).
International Search Report in International Application No. PCT/IB2009/007480; dated Mar. 23, 2010.
Written Opinion of the International Searching Authority in International Application No. PCT/IB2009/007480; dated Mar. 23, 2010.

\* cited by examiner

*Primary Examiner* — Yalkew Fantu
*Assistant Examiner* — Manuel Hernandez
(74) *Attorney, Agent, or Firm* — Oliff PLC

(57) ABSTRACT

A charging cable, used for charging an electric storage device in an electric vehicle from an external power supply, controls a usage history of the charging cable by a CCID, displays a warning on an external monitor, and regulates charging when a service life limit of the charging cable has been exceeded.

13 Claims, 8 Drawing Sheets

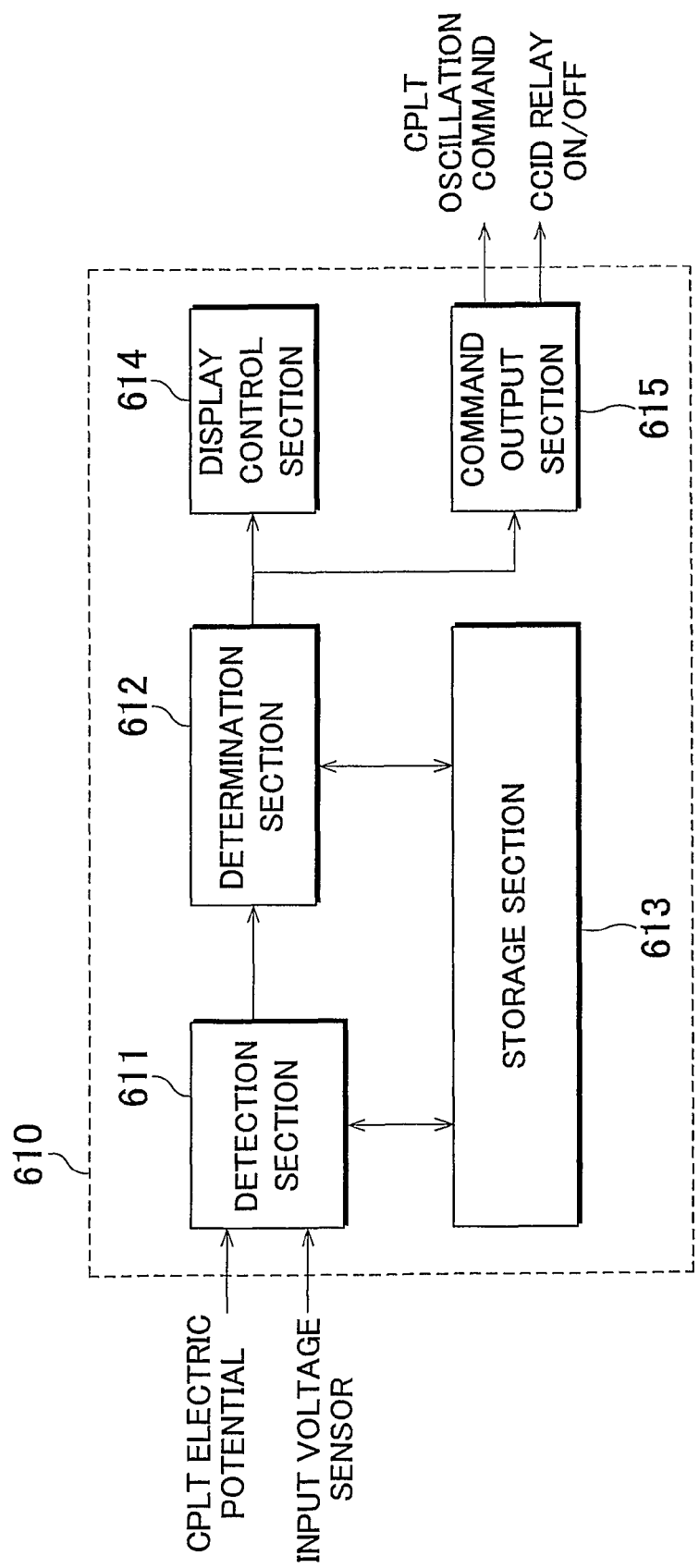

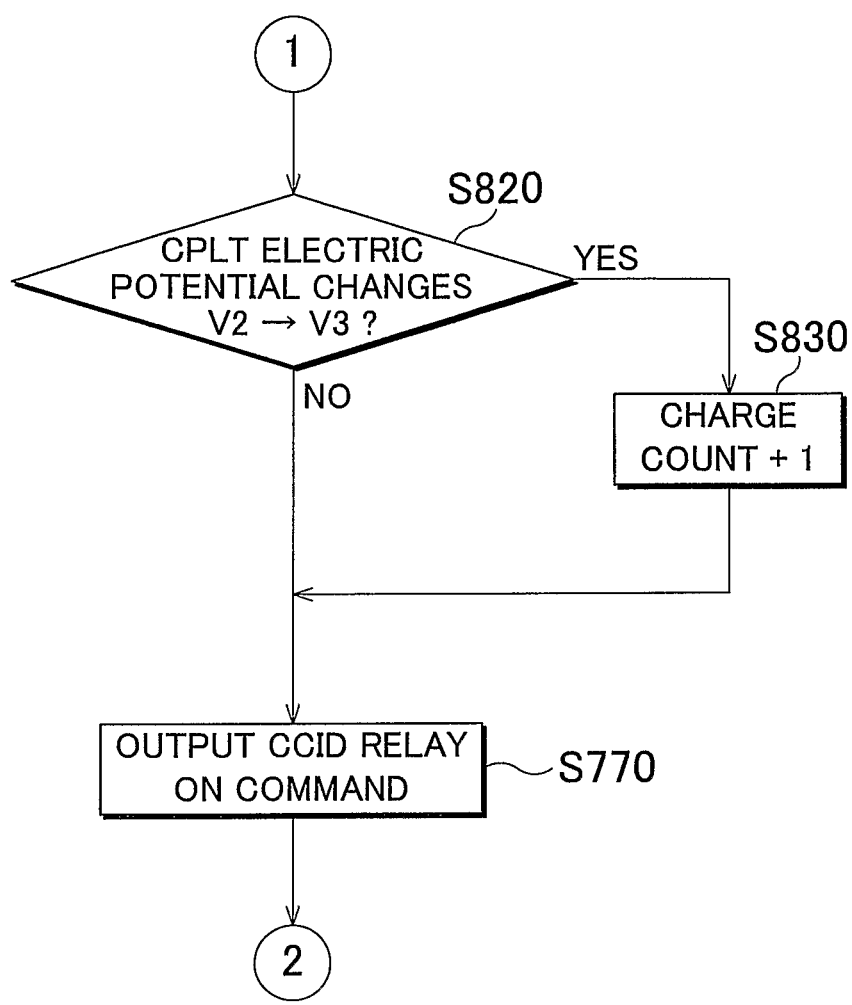

CHARGING CABLE FOR ELECTRIC VEHICLE AND METHOD OF CONTROLLING CHARGING CABLE USING DETERMINATION OF A CHARGING CABLE USAGE HISTORY

BACKGROUND OF THE INVENTION

1. Field of the Invention

The present invention relates to charging cables for electric vehicles. More particularly, the present invention relates to a charging cable, used for charging the electric vehicle, and a method of controlling the charging cable that allows an electric storage device used for driving a vehicle to be charged from an external power supply.

2. Description of the Related Art

Generally, electric vehicles are provided with an electrical storage device (for example, secondary battery or capacitor), and travels by using driving force generated by the electric power stored in the electric storage device. The electric vehicle includes, for example, an electric vehicle, a hybrid vehicle, and a fuel-cell electric vehicle.

Recently, a technique is proposed that the electric storage device that is provided in these electric vehicles is charged by a commercial power source that delivers high power generation efficiency. This technique is expected to improve, fuel consumption efficiency of the hybrid vehicle, for example. In particular, attention is focused on the technique that the electric storage device provided in the electric vehicle is charged by the commercial power source (relatively low voltage power source of 100V and 200V for example) that is supplied for home use.

Japanese Patent Application Publication No. 7-29639 (JP-A-7-29639) describes an electric vehicle charging connector that improves connection workability.

In addition, SAE Electric Vehicle Conductive Charge Coupler, published in the United States in November 2001 by SAE International, describes the standards related to vehicle inlets and connectors in a charging system of electric vehicles, and recommends that a common charging cable and connector be used among different automobiles.

As described above, when charging cables and connectors for electric vehicles are standardized, a common cable can commonly be used for several vehicles, and also the same cable can continuously be used for a newly purchased vehicle.

Unfortunately, when the charging cable is frequently used for a long time, the charging cable including its connector may deteriorate due to the use over the service life limit. If a deteriorated cable is used, the cable itself and vehicle side devices such as an electric storage device can be damaged.

SUMMARY OF THE INVENTION

The present invention provides a charging cable for an electric vehicle that can charge a battery storage device, used to power a vehicle, from an external power supply and a method that prevents the use of the charging cable beyond its service life limit.

A charging cable for an electric vehicle according to a first aspect of the present invention includes: a first coupler that connects the charging cable to the vehicle; a second coupler that connects the charging cable to an external power supply of the vehicle; a control device that controls a usage history of the charging cable; and an electric wire section that connects the first and second couplers to the control device, through which the power and control signals pass. Accordingly, electric power can be supplied from the external power supply through the charging cable to the electric storage device in the vehicle in order to charge the electric storage device that is provided in the vehicle.

The control device of the charging cable described above includes: a storage section that stores the usage history of the charging cable; a detection section that detects a usage state of the charging cable and updates the usage history of the charging cable based on the detected usage state; and a determination section that determines whether a service life limit of the charging cable has been exceeded based on the stored usage history and a reference value.

With the above construction, the usage history of the charging cable can be controlled by the charging cable itself. Therefore, the same charging cable can commonly be used for a plurality of vehicles. And, when the same cable is continuously used in a newly purchased vehicle, the usage history of the charging cable can continuously be controlled. Accordingly, the charging cable can be prevented from being used beyond the service life limit.

The charging cable may further includes a display control section that indicates the service life limit has been exceeded when the determination section of the control device determines that the service life limit of the charging cable has been exceeded.

With this construction, a user who is about to charge the vehicle can be notified the information about the usage history of the charging cable, so that the user can take proper action such as cable replacement, repair, and removal. Accordingly, the charging cable can be prevented from being used beyond the service life limit.

The charging cable may further include a command output section that sends commands to limit the charging of the vehicle when the determination section of the control device determines that the service life limit of the charging cable has been exceeded.

With this construction, when the user tries to continuously use the charging cable that has exceeded the service life limit, the charging operation is limited by the charging cable. Accordingly, the influence on the devices such as the charging cable and the electric storage device on the vehicle side can be reduced.

The usage state of the charging cable may include at least one of a connection state of the first coupler, a connection state of the second coupler and a charging state of the vehicle.

With this configuration, connection history and charging history of the charging cable can be controlled as the usage history. In this case, "usage history information of the charging cable" may include at least one of: the number of connection between the couplers of the charging cable and the vehicle and external power supply; time of connection between the couplers of the charging cable and the vehicle and external power supply; and the charging count by using the cable; and time of charging by using the cable. Also, "reference value" used in the above determination may be an upper limit value that defines the service life limit in relation to the number of connections, the time of connection, the charging count, and the time of charging (hereinafter also referred to as "connection count").

Here, the number of connection indicates how many times the couplers have been connected to the vehicle and the external power supply since the charging cable was used first. The time of connection indicates how long the couplers have stayed in connection in total since the charging cable was used first. The charging count indicates how many times the vehicle has been charged from the external power supply through the charging cable since the charging cable was used first. The time of charging indicates how long the charging cable has experienced actual charging in total since the charging cable was used first.

Through the control of the number of connection, mechanical deterioration of the couplers and the cable that is caused mainly by connection and disconnection of the cable can also be controlled. Through the control of the time of connection, the charging count and the time of charging, thermal deterioration of the cable and electrical deterioration of a relay contact that are caused by energization can be controlled.

The control device of the charging cable may detect a connection state and a charging state of the first coupler and the second coupler based on control signals exchanged between the control device and the vehicle and the external power supply through the electric wire section.

With this construction, the connection of the charging cable to the vehicle and the external power supply can be detected, and thus the connection history and the charging history of the charging cable can be controlled.

The control signal is a standardized signal that is exchanged between the control device and the vehicle. The standardized signal may be generated when the second coupler is connected to the external power supply, and the signal may be set to a predetermined electric potential when the first coupler is connected to the vehicle inlet.

The control device may set the control signal to the oscillating signal with a duty cycle that corresponds to the current-carrying capacity of the charging cable when the first coupler and the second coupler are connected to the vehicle inlet and the external power supply, respectively. When the oscillating signal is generated, the vehicle starts to charge the electric storage device by the electric power from the external power supply.

The charging cable may further include a relay that is interposed between electric power paths of the electric wire section. When the standardized signal is set to the oscillating signal, its amplitude may be changed by the vehicle from a first amplitude to a second amplitude. The control device may close the relay once the amplitude of the standardized signal has changed to the second amplitude.

With this construction, a standardized signal can be used between the charging cable and the control device on the vehicle side. Accordingly, even when the charging cable is commonly used in the different vehicle models and the different vehicle manufacturers, connection between the charging cable and the vehicle can securely be detected, and thus the connection history and the charging history of the charging cable can be controlled.

The method of controlling the charging cable according to a second aspect of the present invention includes: storing usage history of the charging cable; detecting a usage state of the charging cable; updating the usage history of the charging cable based on the detected usage state; and determining whether a service life limit of the charging cable has been exceeded based on the stored usage history and a reference value.

In the second aspect, when it is determined that the service life limit has been exceeded, an indication that the service life limit is exceeded may be displayed.

In the second aspect, when it is determined that the service life limit has been exceeded, charging of the vehicle may be limited.

The usage state of the charging cable may include at least one of a connection state of the first coupler, a connection state of the second coupler, and a charging state of the vehicle.

In the second aspect, the connection state of the first and second couplers and the charging state may be detected based on the control signal that is exchanged between the charging cable and the vehicle.

The control signal is a standardized signal that is exchanged between the charging cable and the vehicle. The standardized signal may be generated when the second coupler is connected to the external power supply, and the standardized signal may be set to a predetermined electric potential when the first coupler is connected to the vehicle inlet.

The standardized signal may be set to an oscillating signal with a duty cycle that corresponds to the current-carrying capacity of the charging cable when the first coupler and the second coupler are connected to the vehicle inlet and the external power supply, respectively. Also, the amplitude of the oscillating signal may be changed from a first amplitude to a second amplitude when the oscillating signal is generated. Charging operation of the electric storage device by using the electric power from the external power supply may be started when the amplitude of the standardized signal changes to the second amplitude.

Through the control of the charging cable with the above method, the charging cable can also be prevented from being used beyond the service life limit.

According to the aspects of the present invention, in the charging cable for the electric vehicle that can charge the electric storage device for driving the vehicle by the external power supply, usage history of the charging cable can be controlled and the charging cable can securely be prevented from being used beyond the service life limit.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5 is a functional block diagram that shows a configuration of a usage history control of the charging cable according to an embodiment of the present invention;

FIGS. 6A and 6B is a flowchart that shows a control process of the usage history control of the charging cable according to an embodiment of the present invention;

DETAILED DESCRIPTION OF EMBODIMENTS

Hereinafter, embodiments of the present invention will be described in detail with reference to the drawings. The same or equivalent components in drawings are denoted by the same symbol and the descriptions of those are not repeated.

Figure 1:
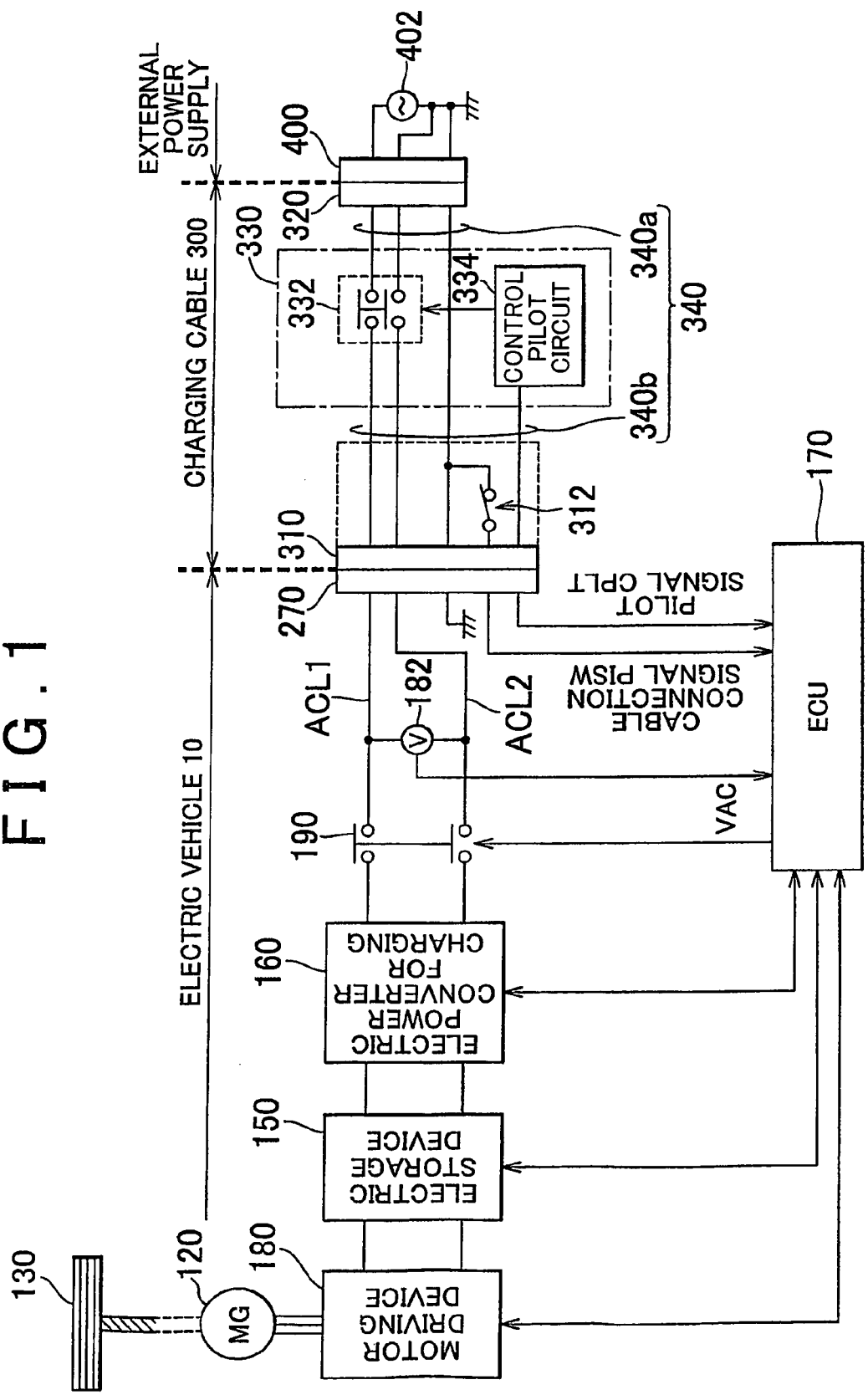
FIG. 1 is a schematic drawing of a charging system according to an embodiment of the present invention.

FIG. 1 is a schematic drawing of a charging system of an electric vehicle 10 according to an embodiment of the present invention. The electric vehicle 10 is not limited to a certain construction as long as the vehicle can be driven by the electric power from the electric storage device that can be charged by the external power supply. The electric vehicle 10 includes, for example, hybrid vehicles, electric vehicles, and fuel-cell vehicles.

As shown in FIG. 1, the electric vehicle 10 includes: an electric storage device 150 that stores electric power used for driving the vehicle; a motor generator (hereinafter also referred to as "MG") 120 that generates driving force; a motor driving device 180 that drives MG 120 by using the electric power stored in the electric storage device 150; a wheel 130 to which the driving force generated by the MG 120 is transmitted; and an electronic control device (hereinafter also referred to as "ECU") 170 that controls overall operation of the electric vehicle 10.

Furthermore, the electric vehicle 10 includes: a vehicle inlet 270 that is provided on the body of the electric vehicle 10 in order to charge the electric storage device 150 by the external power supply; a relay 190; an electric power converter 160 that is used to charge the electric storage device 150 by the external power supply. The electric power converter 160 is connected through the relay 190 to the vehicle inlet 270 by the power lines ACL1 and ACL2. The electric power converter 160 is also connected to the electric storage device 150. A voltage sensor 182 is provided between the power line ACL1 and the power line ACL2. A voltage (voltage from the external power supply) that is detected by the voltage sensor 182 is input to the ECU 170. A cable connection signal PISW and a pilot signal CPLT that are output from the charging cable 300 side are input through the vehicle inlet 270 to the ECU 170.

The electric storage device 150 is an electric storage element that can charge and discharge the electric power. The electric storage device 150 is constituted by a secondary battery such as a lithium-ion battery and a nickel-hydrogen battery or by a capacitor such as an electric double-layer capacitor. The electric storage device 150 further includes: a voltage sensor (not shown) that is provided in the power line connected to the electric storage device 150; and an electric current sensor (not shown) that is provided in the power line on the positive terminal or the negative terminal. The output voltage and electric current signals that are detected by the voltage sensor and the electric current sensor are input to the ECU 170.

The electric power converter 160 is controlled by the ECU 170 the AC power that is transmitted from the external power supply 402 through the charging cable 300, the vehicle inlet 270, the power line ACL1 and ACL2, and the relay 190 to the DC power that charges the electric storage device 150. The electric storage device 150 may directly be charged by using the feed power from the external power supply 402. In this case, the electric power converter 160 is not necessary.

The motor driving device 180 is controlled by the ECU 170, and converts the electric power stored by the electric storage device 150 into the electric power that drives the MG 120. Typically, the MG 120 is constituted by the three-phase synchronous motor of a permanent magnet type, and the motor driving device 180 is constituted by a three-phase inverter. The output torque of the MG 120 is transmitted through a power-split mechanism and reduction gears (not shown) to the wheel 130 in order to propel the electric vehicle 10.

The MG 120 can generate electric power by the rotational force of the wheel 130 during the regenerative braking of the electric vehicle 10. The generated electric power can charge the electric storage device 150 by way of the motor driving device 180.

Besides the MG 120, in the hybrid vehicle in which an engine (not shown) is provided, the engine and the MG 120 cooperate to generate the necessary force for driving the vehicle. The electric storage device 150 can be charged by using the electric power that is generated by the engine rotation.

The charging cable 300 includes: a charging connector 310 on the vehicle side; a plug 320 on the external power supply side; a charging circuit interrupt device (hereinafter also referred to as "CCID") 330; and an electric wire section 340 that connects the devices to pass electric power and a control signal. The electric wire section 340 includes: an electric wire section 340a that connects the plug 320 and the CCID 330; and an electric wire section 340b that connects the charging connector 310 and the CCID 330. The charging connector 310 functions as the "first coupler", and the plug 320 functions as the "second coupler". The CCID 330 functions as the "control device".

The charging cable 300 is connected to a power receptacle 400 of the external power supply 402 (for example, a system power supply) through a plug 320 of the charging cable 300 on the external power supply side. The vehicle inlet 270 provided on the body of the electric vehicle 10 is connected with the charging connector 310 of the charging cable 300 on the vehicle side, and the electric vehicle 10 is charged by the external power supply 402.

The charging connector 310 has a limit switch 312 that detects the connection of the charging connector 310. When the vehicle inlet 270 and the charging connector 310 are connected, the limit switch 312 is closed. One end of the limit switch 312 is connected to a control wire in the charging cable 300 that is ground on the vehicle side and the external power supply side, and the other end is connected through the charging connector 310 to the ECU 170 on the vehicle side. When the limit switch 312 is closed, the cable connection signal PISW is input to the ECU 170.

The CCID 330 includes a CCID relay 332 and a control pilot circuit 334. The CCID relay 332 is provided in the power line pair in the charging cable. The control pilot circuit 334 controls On/Off operation of the CCID relay 332. When the CCID relay 332 is turned off, the electric circuit is interrupted in the charging cable. On the other hand, when the CCID relay 332 is turned on, electric power can be supplied from the external power supply 402 to the electric vehicle 10.

The control pilot circuit 334 outputs the pilot signal CPLT through the charging connector 310 and the vehicle inlet 270 to the ECU 170 of the vehicle. The pilot signal CPLT is a signal that notifies a rated current of the charging cable from the control pilot circuit 334 to the ECU 170 of the vehicle. Also, the pilot signal CPLT is used as a signal for the ECU 170 to remotely operate the CCID relay 332 based on the electric potential of the pilot signal CPLT, which is operated by the ECU 170. The control pilot circuit 334 controls the on/off operation of the CCID relay 332 based on the change in the electric potential of the pilot signal CPLT. That is, the pilot signal CPLT is transmitted and received between the ECU 170 and the CCID 330.

Figure 2:
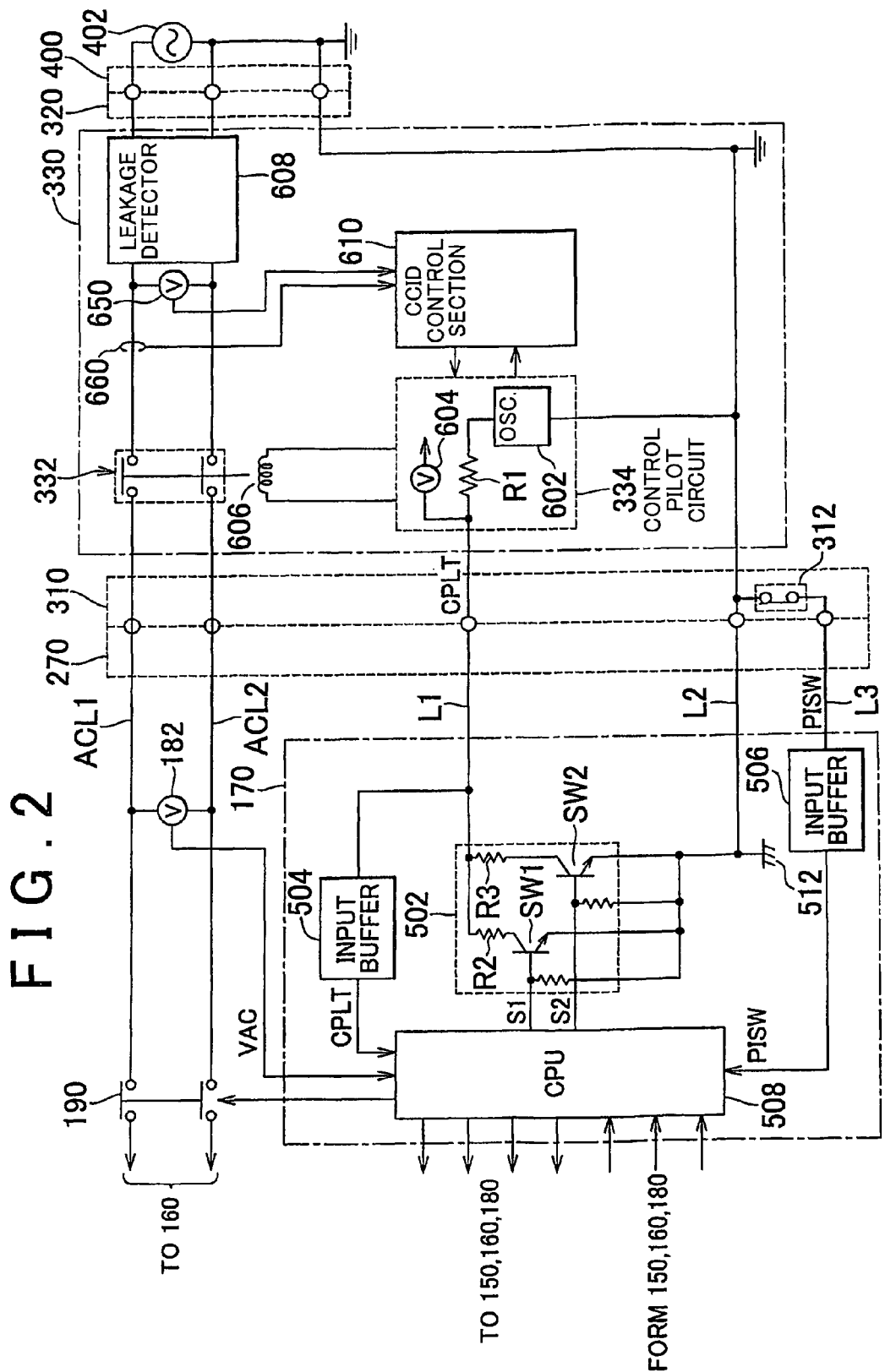
FIG. 2 is an example diagram that shows a charging mechanism of FIG. 1 in detail.

FIG. 2 illustrates the charging mechanism of FIG. 1 in detail. Referring to FIG. 2, in addition to the CCID relay 332 and the control pilot circuit 334, the CCID 330 includes: a magnet coil 606; a leakage detector 608; a CCID control section 610; a voltage sensor 650; and an electric current sensor 660. The control pilot circuit 334 includes an oscillator 602, a resistance element R1, and a voltage sensor 604.

The CCID control section 610 includes, although not shown, a central processing unit (CPU), a storage device, an input-output buffer, and a display. The CCID control section 610 inputs and outputs a signal between various sensors and the control pilot circuit 334, and controls the charging operation of the charging cable 300.

When the electric potential of the pilot signal CPLT detected by the voltage sensor 604 approximates to the specified electric potential V1 (for example 12V), the oscillator 602 outputs a non-oscillation signal. When the electric potential of the pilot signal CPLT decreases from the V1, the oscillator 602 outputs an oscillation signal that oscillates with a specified frequency (for example, 1 kHz) and a specified duty cycle.

The electric potential of the pilot signal CPLT may be controlled by the ECU 170 on the vehicle side as described later. The duty cycle is set according to the rated current that may be supplied from the external power supply 402 to the vehicle through the charging cable.

Figure 3:
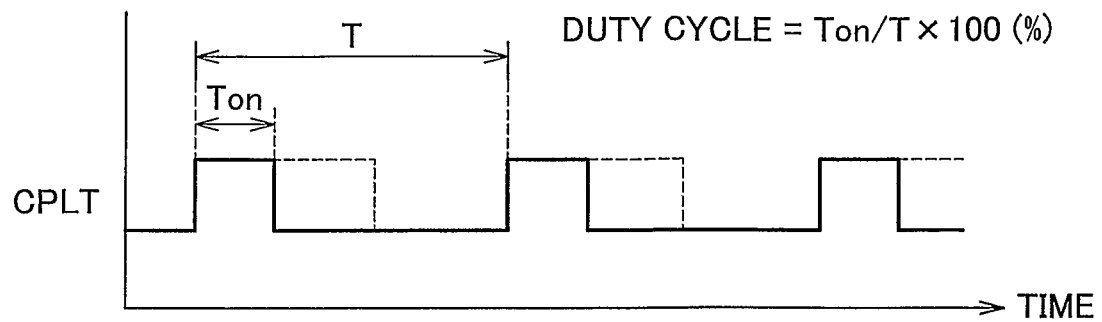
FIG. 3 is a chart that shows an example waveform of a pilot signal that is generated by a control pilot circuit of FIG. 2.

FIG. 3 shows a example waveform of a pilot signal CPLT that is generated by a control pilot circuit 334 of FIG. 2.

Referring to FIG. 3, the pilot signal CPLT oscillates at a specified frequency T when the electric potential of the pilot signal CPLT decreases from V1 as described above. A pulse width Ton of the pilot signal CPLT is set based on the rated current that can be supplied from the external power supply 402 to the electric vehicle 10 through the charging cable 300. That is, according to the duty cycle indicated by the ratio of the pulse width Ton to the frequency T, the rated current is notified from the control pilot circuit 334 to the ECU 170 of the electric vehicle 10 by using the pilot signal CPLT.

The rated current is specific to each charging cable. Different types of charging cable are rated for different currents. Accordingly, every charging cable has a different duty cycle of the pilot signal CPLT.

The vehicle ECU detects the rated current that may be supplied through the charging cable 300 based on the duty cycle of the pilot signal CPLT that is received through a control pilot line L1.

Referring again to FIG. 2, when if electric potential of the pilot signal CPLT is reduced by the ECU 170 to approximately the specified electric potential V3 (for example, 6V), the control pilot circuit 334 supplies an electric current to the magnet coil 606. If the electric current is supplied from the control pilot circuit 334, the magnet coil 606 generates the electromagnetic force and activates the CCID relay 332.

The leakage detector 608 detects leakage and is provided in the power line pair of the charging cable in the CCID 330. Specifically, the leakage detector 608 detects a balance of the electric currents that flow in each direction of the power line pair. When the balance between the electric currents is lost, the leakage detector 608 detects that a leak has occurred. Although not shown in the drawings, when the leakage detector 608 detects the leak, the power supply to the magnet coil 606 is interrupted, and the CCID relay 332 is turned off.

The voltage sensor 650 detects that the plug 320 of the charging cable 300 is inserted to the power receptacle 400, and thus connected to the external power supply 402, and notifies the state to the CCID control section. The electric current sensor 660 detects the charging current that flows through the power line, and thus detects that charging from the external power supply 402 to the electric vehicle 10 is actually started. Then, the electric current sensor notifies the state to the CCID control section 610. The detail of the CCID control section 610 will be described later.

The vehicle ECU 170 includes a resistance circuit 502, an input buffer 504, an input buffer 506, and a CPU 508. The resistance circuit 502 includes a pull-down resistor R2, a pull-down resistor R3, a switch SW1, and a switch SW2. The pull-down resistor R2 and the switch SW1 are connected in series between a control pilot line L1 through which the pilot signal CPLT is transmitted and a vehicle ground 512. The pull-down resistor R3 and the switch SW2 are also connected in series between a control pilot line L1 and a vehicle ground 512. The switches SW1 and SW2 are each turned on or off in accordance with control signals S1 and S2 from the CPU 508.

The resistance circuit 502 is used to control the electric potential of the pilot signal CPLT from the vehicle. That is, when the connector 310 is connected to the vehicle inlet 270, the switch SW2 is activated in accordance with the control signal S2, and the resistance circuit 502 reduces the electric potential of the pilot signal CPLT to the electric potential V2 (for example 9V) using the pull-down resistor R3. When checks on the weld of the relay and other processes are finished in the electric vehicle 10, the switch SW1 is activated in accordance with the control signal S1, and the pull-down resistors R2 and R3 of the resistance circuit 502 reduce the electric potential of the pilot signal CPLT to the specified electric potential V3 (for example 6V). In this way, the ECU 170 remotely controls the CCID relay 332 when the resistance circuit 502 controls the electric potential of the pilot signal CPLT.

The CCID control section 610 detects that the plug 320 of the charging cable 300 is connected to the power receptacle 400 if the electric potential of the pilot signal CPLT changes from 0V to the specified electric potential V1. The CCID control section 610 detects that the charging connector 310 of the charging cable 300 is connected to the vehicle inlet 270 of the electric vehicle 10 if the electric potential of the pilot signal CPLT changes from the specified electric potential V1 to the specified electric potential V2.

The input buffer 504 receives the pilot signal CPLT of the control pilot line L1, and outputs the received pilot signal CPLT to the CPU 508. The input buffer 506 receives a cable connection signal PISW from the signal line L3 connected to a limit switch 312 of the charging connector 310, and outputs the received cable connection signal PISW to the CPU 508. A voltage is applied to the signal line L3 by the ECU 170, so that when the connector 310 is connected to the vehicle 270 and the limit switch 312 is turned on, the electric potential of the signal line L3 reaches a grounding level. That is, the cable connection signal PISW is set to a logically low level when the connector 310 is connected to the vehicle inlet 270, and set to a logically high level when the connector 310 is not connected to the vehicle inlet 270.

The CPU 508 determines whether the external power supply 402 is connected to the electric vehicle 10 based on the cable connection signal PISW and the pilot signal CPLT. Specifically, the CPU 508 detects the connection between the vehicle inlet 270 and the connector 310 based on the cable connection signal PISW received from the input buffer 506, and detects the connection between the plug 320 and the power receptacle 400 based on the presence or absence of the pilot signal CPLT received from the input buffer 504.

If, based on the cable connection signal PISW, it is determined that the connector 310 is connected to the vehicle inlet 270, the CPU 508 activates the control signal S2. Accordingly, the electric potential of the pilot signal CPLT decreases from V1, and thus the pilot signal CPLT oscillates. Then, the CPU 508 detects the rated current that can be supplied from the external power supply 402 to the electric vehicle 10 based on the duty cycle of the pilot signal CPLT.

When the rated current is detected, the CPU 508 activates the control signal S1. Accordingly, the electric potential of the pilot signal CPLT decreases to V3, and the CCID relay 332 is activated in the CCID 330. Then, the CPU 508 activates the relay 190 (FIG. 1). An AC current is given to the electric power converter 160 for charging (FIG. 1) by the external power supply 402. In this way, preparation for charging the electric storage device 150 (FIG. 1) from the external power supply 402 is completed. When the CPU 508 outputs the control signal to the electric power converter 160 (FIG. 1) in order to convert the electric power, the electric storage device 150 (FIG. 1) is charged.

Figure 4:
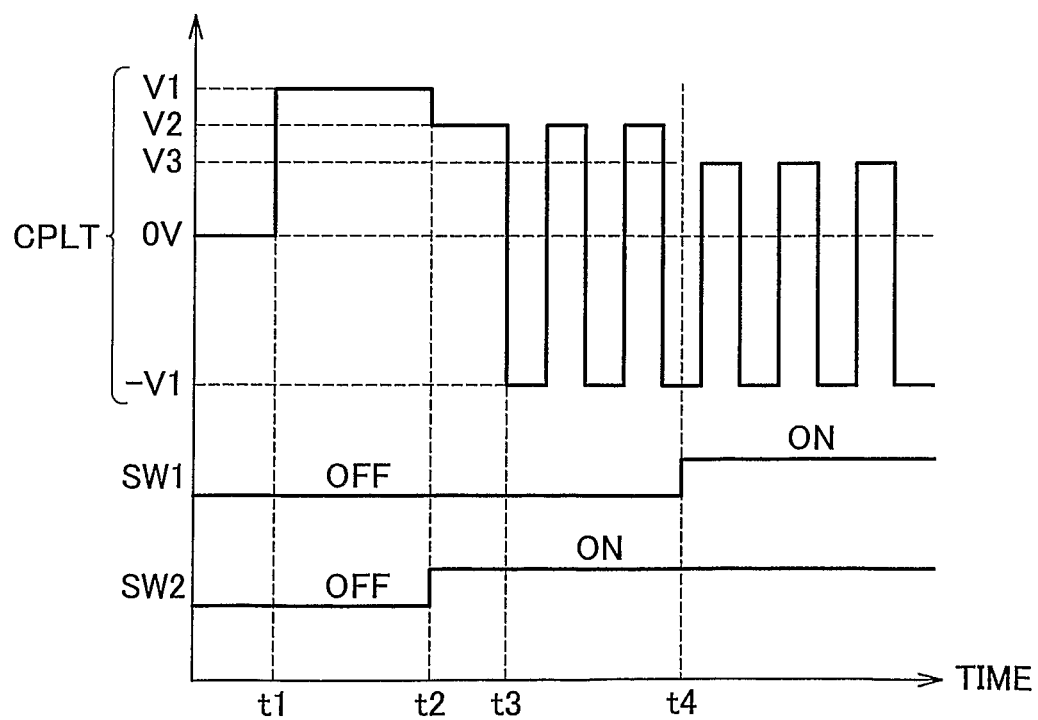
FIG. 4 is a timing diagram of a pilot signal CPLT, a switch SW1, and a switch SW2 when charging is started.

Electric potential change of the pilot signal CPLT is described with reference to FIG. 4. FIG. 4 is a timing diagram of a pilot signal CPLT, the switch SW1, and the switch SW2 when charging is started.

Referring to FIG. 4 and FIG. 2, when the plug 320 of the charging cable 300 is connected to the power receptacle 400 of the external power supply 402 at time t1, the control pilot circuit 334 generates a pilot signal CPLT by receiving the electric power from the external power supply 402.

At the time t1, the connector 310 of the charging cable 300 is not connected to the vehicle inlet 270. The electric potential of the pilot signal CPLT is V1 (for example, 12V), and the pilot signal CPLT does not oscillate. By detecting that the electric potential of the pilot signal CPLT changes to V1, the CCID control section 610 can detect that the plug 320 is connected to the power receptacle 400.

When the connector 310 is connected to the vehicle inlet 270 at time t2, the connection between the connector 310 and the vehicle inlet 270 is detected on the basis of the cable connection signal PISW. Accordingly, the CPU 508 activates the switch SW2. Then, the electric potential of the pilot signal CPLT decreases to V2 (for example, 9V) by the pull-down resistor R3 of the resistance circuit 502.

When the electric potential of the pilot signal CPLT had decreased to V2, the CCID control section 610 detects that the connector 310 is connected to the vehicle inlet 270. At time t3, the control pilot circuit 334 oscillates the pilot signal CPLT.

When the pilot signal CPLT oscillates, the CPU 508 detects a rated current based on the duty cycle of the pilot signal CPLT. When vehicle side preparation for charging control is completed, the CPU 508 activates the switch SW1 at time t4. Then, the electric potential of the pilot signal CPLT further decreases to V3 (for example, 6V) by the pull-down resistors R2 and R3 of the resistance circuit 502.

When the electric potential of the pilot signal CPLT has decreased to V3, an electric current is supplied from the control pilot circuit 334 to the magnet coil 606 and the relay 332 of the CCID 330 is activated. Then, the electric storage device 150 is charged from the external power supply 402 by the control of the CPU 508 as described above.

The electric potential change of the pilot signal CPLT shown in FIG. 4 is standardized by SAE. Thus, charging is kept in the same electric potential change even if the manufacturers and models of the automobile are different. Therefore, the same cable may commonly be used among different vehicle models and the different vehicle manufacturers.

The above description shows the example in which the plug 320 on the external power supply side is connected before the charging connecter 310 on the vehicle side. However, if the charging connector 310 on the vehicle side is connected before the plug 320 on the external power supply side, the CPU 508 on the electric vehicle 10 side activates the switch SW2 after confirming the reception of the pilot signal CPLT transmitted by the CCID 330, and thus the electric potential of the pilot signal CPLT changes in the same way as that described in connection with FIG. 4.

As described below, charging is limited when the service life limit of the charging cable is exceeded. If the electric potential of the pilot signal CPLT decreases to V2 at the time t3 in FIG. 4, the control pilot circuit 334 does not oscillate the pilot signal CPLT according to the command to limit charging. Then, the CPU 508 does not detect a rated current based on the duty cycle of the pilot signal CPLT, and accordingly does not activate the switch SW1. As a result, the electric storage device 150 is not charged from the external power supply 402.

The usage history control executed by the CCID control section 610 of the charging cable 300, according to an embodiment of the present invention, is described with reference to the functional block diagram of FIG. 5.

Referring to FIG. 5, the CCID control section 610 includes a detection section 611, a determination section 612, a storage section 613, a display control section 614, and a command output section 615. Each functional block is performed by executing a program that is stored in a CPU (not shown) in the CCID control section 610. Each of these functional blocks may be performed by a corresponding electronic circuit (hardware) that is mounted in order to achieve the function corresponding to each block.

The detection section 611 receives a detection signal of the electric potential of the pilot signal CPLT from the voltage sensor 604 and a voltage detection signal of the external power supply 402 from the voltage sensor 605.

The detection section 611 detects a connection state of the charging connector 310 and the plug 320 based on the input signal, and updates the connection history information and the charging history information based on the detection results. Specifically, the detection section 611 updates the count values, which are the number of connection and the time of connection as the connection history information, and the charging count and the charging duration as the charging history information. That is, detection section 611 accumulates the count values in the respective count values of the previous connection count, the connection duration, the charging count, and the charging duration that are stored in the storage section 613, and stores those values in the storage section 613 again as a cumulative value.

The determination section 612 compares the cumulative history information with the upper limit value of the service life limit for each of the connection count, the connection duration, the charging count, and the charging duration. Then, the determination section 612 determines whether the cumulative value of the connection count exceeds the service life limit.

The CCID control section 610 detects that the external power supply 402 and the plug 320 are connected when the detection section 611 detects a change in the electric potential of the pilot signal CPLT from 0V to V1 (in other words, when the detection section 611 detects that the CCID 330 is supplied with power). When the detection section 611 detects that the electric potential changes from V1 to V2, the CCID control 611 section detects that the charging connector 310 is connected to the electric vehicle 10. The CCID control section may detect the connection on the external power supply 402 by using a power supply voltage detection signal of the voltage sensor 650. Also, the connection with the electric vehicle 10 may be detected by detecting an open-close signal (not shown) of the CCID relay 332 or an open-close signal (not shown) of the limit switch 312.

The CCID control section 610 may detect that charging is actually started by detecting that the electric potential of the pilot signal CPLT changes from V2 to V3. The accumulation of the charging count and the calculation and accumulation of the time of charging may be performed on the basis of this detection.

Although not shown in FIG. 5, the CCID control section 610 may be configured such that the CCID control section 610 detects the actual charging current detected by the electric current sensor 660, and then determined that the charging is actually started. If the start of the charging operation is detected using the electric potential change of the pilot signal CPLT, the electric current sensor 660 is not necessary.

As described above, the pilot signal CPLT is a standardized signal. That is, by detecting the connection based on the electric potential change of the pilot signal CPLT, the connection may be detected even if the same charging cable is used with different automobiles from different manufacturers.

As described above, by controlling the connection count, mechanical deterioration of the couplers and the cable that is mainly results from connecting and disconnecting the cable may be controlled. By controlling the time of connection, the charging count, and the time of charging, thermal deterioration of the cable and electrical deterioration of a relay contact due to energization may be controlled.

When the determination section 612 determines that the number of the connection exceeds the service life limit, the display control section 614 notifies the user through a display (not shown), such as a LCD display attached to a body of the CCID 330, that the charging cable 300 has reached the service life limit. A light emitting diode (LED) or a lamp may be provided beside the screen display to indicate the state as a steady light, flashing light, or extinguished. Additionally, it may be displayed on the external terminal by using radio or other communications. It is not only limited to the visual notification method as described above, but audible notification method such as a buzzer and a chime may be used concurrently. If a screen display is used, the contents shown on the screen are not only the service life limit. For example, the cumulative connection count, the remaining number of connections, and various warnings and states may always been shown on the display.

The command output section 615 outputs the signal, which regulates the charging, to the control pilot circuit 334. Specifically, when the connection count exceeds the service life limit, the command output section 615 may output a signal that stops the oscillation of the pilot signal CPLT or a signal that turns off the CCID relay 332. If the pilot signal CPLT does not oscillate, a rated current is not recognized by the CPU 508 of the electric vehicle 10. Accordingly, the switch SW1 is not activated, and as a result, the CCID relay 332 is also not activated. The CCID relay 332 also interrupts the power line in accordance with the signal that forcibly deactivates the CCID relay 332, so that the charging is not started. Thus, charging can be regulated in this way.

As described above, the CCID control section 610 controls the usage history of the charging cable 300, notifies the user when the service life limit is exceeded, and regulation of charging.

Figure 6A:
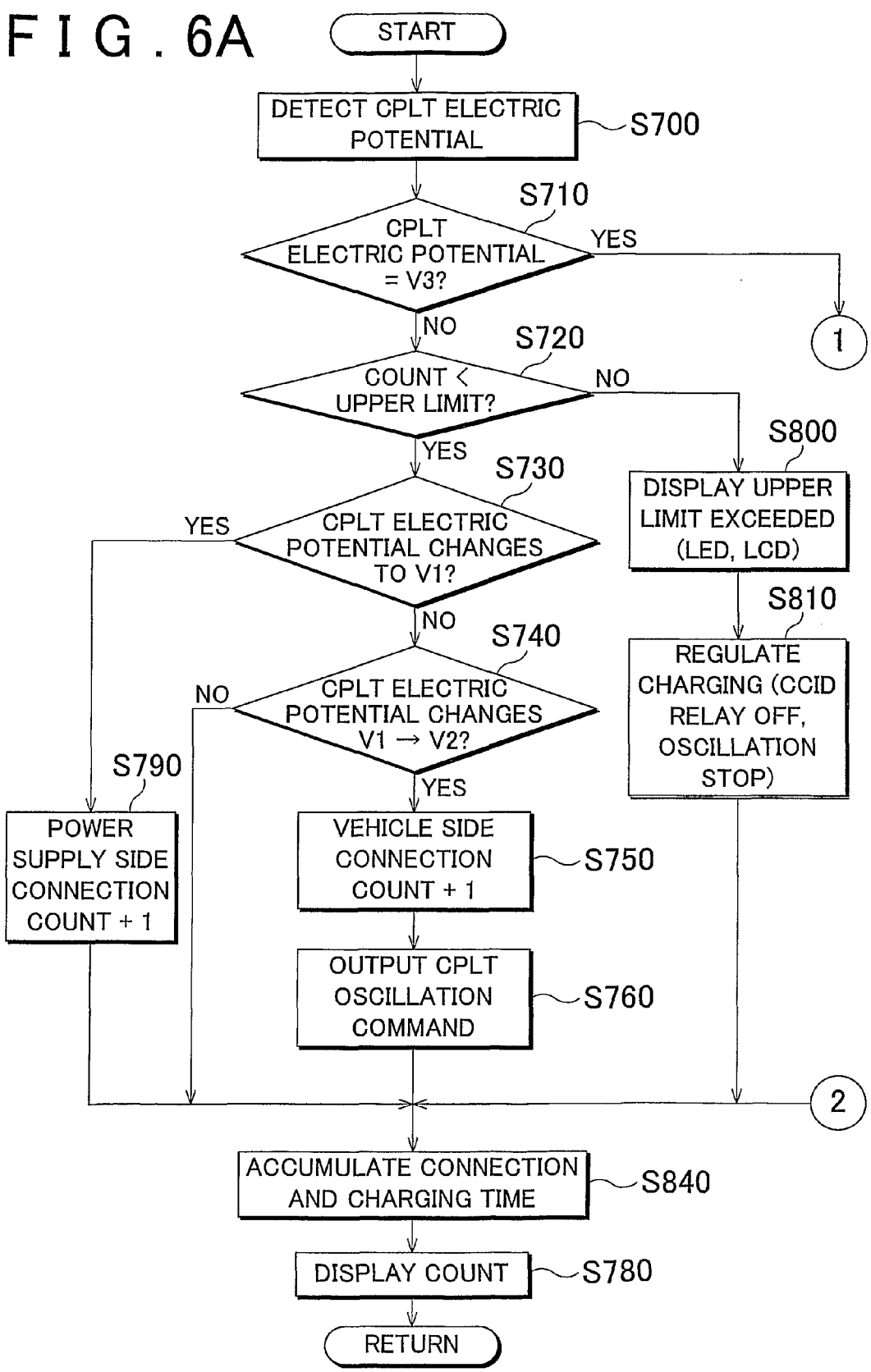

FIGS. 6A and 6B is a flowchart that shows the control process of the usage history control of FIG. 5. The flowchart shown in FIGS. 6A and 6B is carried out by executing the program stored in the CCID control section 610 which is a control device according to the present embodiment at predetermined intervals (for example 100 ms).

Referring to FIGS. 6A and 6B, a flowchart illustrating the control process executed by the program stored in the CCID control section 610 is described.

As described above, it is possible to determine whether the charging cable is connected and whether charging has started based on the electric potential of the pilot signal CPLT controlled by the resistance circuit 502 on the vehicle side. In step 700 (hereinafter the step is indicated by "S"), the CCID control section 610 detects the electric potential of the pilot signal CPLT based on the signal from the control pilot circuit 334.

In S710, the CCID control section 610 determines whether the electric potential of the pilot signal CPLT is equal to V3, in other words whether charging has started. If charging has started (YES in S710), the process proceeds to S820, S830, S770, S840, and S780, and then the CCID relay 332 is activated to continue charging. Then, charging count and the charging duration are accumulated. On the other hand, if charging has not started (NO in S710), the process proceeds to S720, and then the connection state of the charging cable is detected as described below.

In S720, the CCID control section 610 determines whether the connection history information (number and time of connection) and the charging history information (number and time of charging) exceed the certain upper limit value. If any of the counts exceeds the upper limit value (NO in S720), the process proceeds to S800 and the exceeding of the service life limit is displayed on the display in order to make notification to the user, because the charging cable is beyond its life limit and thus cannot be used. Then the process proceeds to S810, and the CCID control section 610 outputs, to the control pilot circuit 334, a signal that prohibits the pilot signal CPLT from oscillating and that prohibits the CCID relay 332 from being turned on in order to regulate the charging. The CCID control section 610 accumulates the time of connection in S840, and in S780, the CCID control section 610 displays the current values of each count and warnings indicating that the service life is close to the limit. Then, the process is returned to the main routine. The step 780 may be omitted.

In S720, if all counts are the upper limit value or below (YES in S720), the CCID control section 610 determines that the charging cable 300 is within the service life limit and thus usable, and then proceeds the process to S730.

In S730, the CCID control section 610 determines whether the electric potential of the pilot signal CPLT has changed to V1. If the electric potential has changed to V1 (YES in S730), it indicates that the plug 320 has been connected to the external power supply. Accordingly, in S790, a number is added to the count of the number of connection on the power supply side, and the time of connection is accumulated in S840 and the results are displayed in S780.

In S730, if the electric potential of the pilot signal CPLT is kept at V1 or not V1 (NO in S730), the process proceeds to S740 in order to determine whether the electric potential of the pilot signal CPLT has changed to V2.

If the electric potential of the pilot signal CPLT changes to V2 (YES in S740), it indicates that the charging connector 310 is connected to the vehicle inlet 270 at the time of the change. Accordingly, the vehicle side connection count is increased by 1 in S750.

The charging cable 300 is connected to both the external power supply and the vehicle. In S760, the CCID control section 610 outputs a signal 334 to notify to the control pilot circuit that the pilot signal CPLT may oscillate. Here, when the preparation for charging on the vehicle side is completed, the ECU 170 of the electric vehicle 10 changes the electric potential of the pilot signal CPLT to V3. Later, the time of connection is accumulated in S840, the result is displayed on the display in S780, and the process returns to the main routine.

In S740, if the electric potential of the pilot signal CPLT does not change from V1 to V2 at the time of change (in the case of NO), it indicates that the charging connector 301 is not connected to the vehicle or that the charging connector 310 is connected but charging is not started. Therefore, the process proceeds to S840 where the time of connection is accumulated, and in S780, the result is displayed on the display, and then the process returns to the main routine.

In S710, if the electric potential of the pilot signal CPLT is V3 (in the case of YES), the CCID control section 610 determines that charging has started or is ongoing. Accordingly, the process proceeds to S820.

In S820, the CCID control section determines whether the electric potential of the pilot signal CPLT changes from V2 to V3 at the time of change, that is, whether the charging is started or is ongoing. If it is time to start charging (YES in S820), the CCID control section 610 increases the charging count in S830, and then the CCID control section 610 outputs a command signal to the control pilot circuit 334 in order to turn on the CCID relay 332 in S770. Accordingly, charging is started.

If charging is continued (NO in S820), the process skips S830 and proceeds to S770. In S770, the CCID control section 610 continuously outputs a command signal in order to turn on the CCID relay 332. Later, the process proceeds to S840 in order to accumulate the time of charging, and finally in S780, the count values are shown on the display, and the process returns to the main routine.

As described above, the usage history control according to an embodiment of the present invention, which is similar to the control of FIG. 5, may also be executed by the CCID control section 610 that executes the control of the flowchart in FIGS. 6A and 6B.

As described above, the charging cable for the electric vehicle and the method of controlling the charging cable according to the present embodiment enables the control of the charging history of the vehicle (number and time of charging) and also enables the control of the connection history (number and time of connection), which is the usage history of the charging cable. Accordingly, use of the charging cable beyond its service life limit may be prevented.

In the present embodiment, the history of the number of connections, the time of connection, the charging count, and the time of charging are controlled as the usage history information. However, the control over all these items is not essential. These items may partially be controlled for the history.

(Modification of the structure of the motor driving device and the electric power converter for charging) Based on the above description, in the embodiments of the present invention, the motor driving device 180 and the electric power converter 160 shown in FIG. 1 are not restricted to any specific circuit configuration in order for the present invention to be applied. Below, a typical configuration of the motor driving device 180 will be described.

Figure 7:
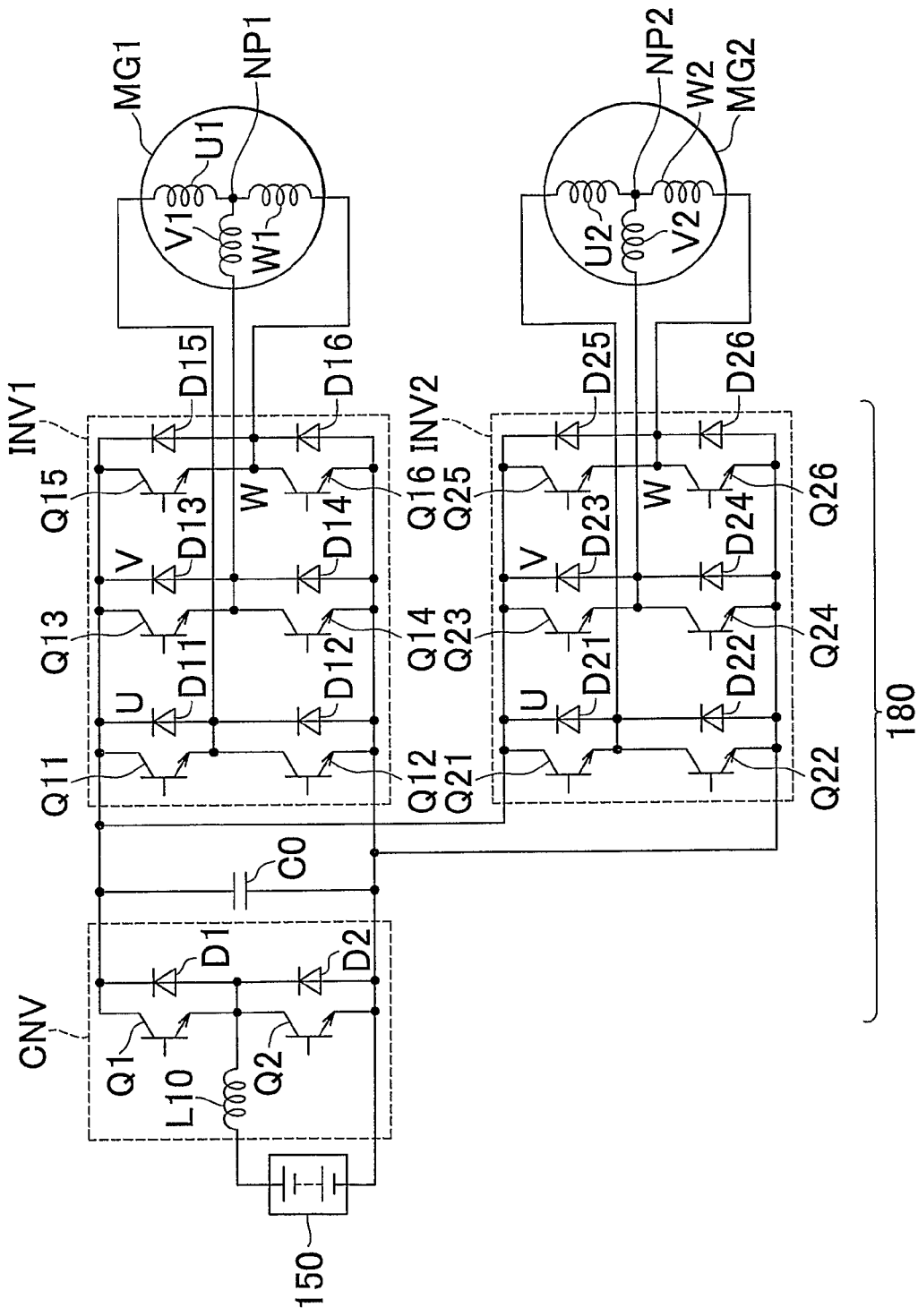
FIG. 7 is a circuit diagram that shows typical construction of a motor driving device shown in FIG. 1.

Referring to FIG. 7, the motor driving device 180 includes: a converter CNV that boosts the output voltage (direct voltage); a smoothing capacitor C0 that smoothes the direct voltage output by the converter CNV; inverters INV1 and INV2 that convert the direct voltage held by the smoothing capacitor C0 to the alternating voltage. Two motor generators MG1 and MG2 are provided in correspondence with the inverters INV1 and INV2 respectively.

The converter CNV includes: a reactor L10; semiconductor switching elements Q1 and Q2; and antiparallel diodes D1 and D2 that are connected in parallel with the semiconductor switching elements Q1 and Q2. The converter CNV may be operated as a boost chopper by the on-off operation of the semiconductor switching elements Q1 and Q2. That is, the voltage applied to the smoothing capacitor C0 or the output voltage of the converter may be varied by the duty control of the semiconductor switching elements Q1 and Q2.

The inverter INV1 is a conventional three-phase inverter that includes semiconductor switching elements Q11 to Q16 and antiparallel diodes D11 to D16. Similarly, the inverter INV2 is an conventional three-phase inverter that includes semiconductor switching elements Q21 to Q26 and antiparallel diodes D21 to D26.

The motor generators MG1 and MG2 are each connected to both the engine (not shown) and the power-split mechanism (not shown). The motor generator MG2 generates the driving force for the wheel 130 in the same way as the MG120 shown in FIG. 1.

That is, in the configuration shown in FIG. 7, the driving force of the wheel 130 may be generated by the engine and the motor generator MG2. Also, the motor generator MG2 generates electric power when the electric vehicle 10 is in regenerative braking. The electric power generated through regenerative braking is converted to the direct voltage by the inverter INV2. The converted direct voltage is applied to the smoothing capacitor C0 and charges the electric storage device 150 through the converter CNV.

The motor generator MG1 is driven by the rotational force of the engine and operates as an electric generator. The motor generator MG1 may also operate as an electric motor of an engine starter when the engine is started. If the power-split mechanism also includes a planetary gear mechanism, the continuously variable transmission may be configured such that the ratio between the revolutions of the motor generators MG1 and MG2 and the engine speed can variably be controlled. Thus, an operating point of the engine can be set suitably.

Figure 8:
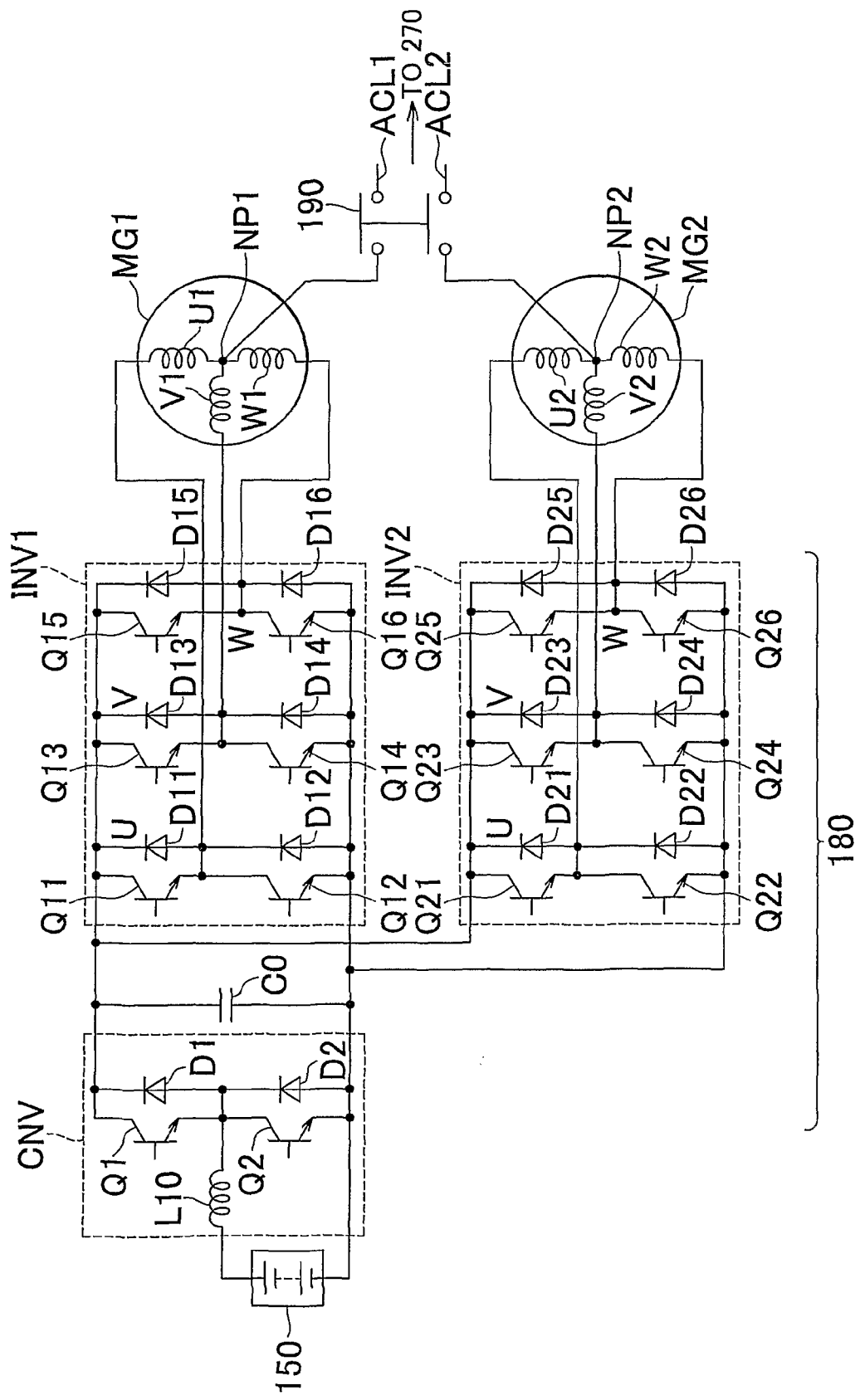
FIG. 8 is a circuit diagram that shows an example charging configuration that uses a motor driving device of FIG. 7.

The electric storage device 150 may be charged by using the configuration shown in FIG. 8 in which the motor driving device 180 is constructed in the same way as FIG. 7. In the configuration of FIG. 8, unlike FIG. 1, a neutral point NP1 of the motor generator MG1 and a neutral point NP2 of the motor generator MG2 are connected with an external power supply 402 that has a single-phase current without the electric power converter 160.

In this case, the electric power converter that converts an alternating voltage from the external power supply 402 to a direct voltage is constructed by a reactor component (coil) of the motor generators MG1 and MG2 and by inverters INV1 and INV2. As described above, the electric power converter 160 may be constructed by the motor driving device 180.

Specifically, the power lines ACL1 and ACL2 in FIG. 1 may be connected through the relay 190 to the neutral points NP1 and NP2 respectively.

The charging cable and the method of controlling the charging cable according to the present embodiment may be applied to the configuration shown in FIG. 8. Accordingly, because the usage history of the charging cable may be controlled, use of the charging cable beyond the service life limit may be prevented in the same way as the above description.

It should be understood that the embodiments described herein are merely illustrative in all respects and are not to be construed as limitative. The scope of the present invention is defined not by the above description but by the appended claims, and the present invention is intended to cover all equivalents and modifications that fall within the scope of the claims.

The invention claimed is:

1. A charging cable for an electric vehicle through which an electric storage device, provided in the vehicle and used for driving the vehicle, is charged from an external power supply, the charging cable comprising:
   a first coupler that connects the charging cable to a vehicle inlet provided in the vehicle;

a second coupler that connects the charging cable to the external power supply;
a control device configured to control a usage history of the charging cable, wherein the control device includes: a storage section that stores the usage history of the charging cable; a detection section that detects a usage state of the charging cable and that updates the usage history based on the detected usage state; a determination section that determines whether a service life limit of the charging cable has been exceeded based on the stored usage history and a reference value; and
an electric wire section that is provided between the first coupler and the control device and between the second coupler and the control device, through which electric power and a control signal pass,
wherein the control device further includes a command output section that sends commands to limit the charging of the vehicle when the determination section determines that the service life limit of the charging cable has been exceeded,
the control device is configured to set the control signal to an oscillating signal upon detecting that the first coupler and the second coupler are connected to the vehicle inlet and the external power supply respectively, and
the commands sent by the command output section include a command to stop oscillation of the control signal in response to a determination by the determination section that the service life limit of the charging cable has been exceeded.

2. The charging cable according to claim 1, wherein the control device further includes a display control section that indicates the service life limit has been exceeded when the determination section determines that the service life limit of the charging cable has been exceeded.

3. The charging cable according to claim 1, wherein the usage state of the charging cable includes at least one of a connection state of the first coupler, a connection state of the second coupler, and a charging state of the vehicle.

4. The charging cable according to claim 3, wherein the detection section detects the charging state and the connection state of the first coupler and the second coupler based on the control signal exchanged between the control device and the vehicle through the electric wire section.

5. The charging cable according to claim 1, wherein the control signal is a standardized signal that is exchanged between the control device and the vehicle through the electric wire section, the standardized signal is generated when the second coupler is connected to the external power supply, and the standardized signal is set to a predetermined electric potential when the first coupler is connected to the vehicle inlet.

6. The charging cable according to claim 1, wherein the control signal is a standardized signal exchanged between the control device and the vehicle through the electric wire section,
the oscillating signal has a duty cycle that corresponds to a current-carrying capacity of the charging cable, and
the vehicle starts to charge the electric storage device by electric power from the external power supply when the oscillating signal is generated.

7. The charging cable according to claim 6, further comprising:
a relay that is provided in an electric power path of the electric wire section,
wherein when the standardized signal is set to the oscillating signal, the amplitude of the standardized signal changes from a first amplitude to a second amplitude by the vehicle, and accordingly the control device closes the relay once the amplitude of the standardized signal has changed to the second amplitude.

8. A method of controlling a charging cable for an electric vehicle through which an electric storage device, that is provided in the vehicle and which powers driving the vehicle, is charged from an external power supply, wherein the charging cable comprises a first coupler that connects the charging cable to a vehicle inlet in the vehicle and a second coupler that connects the charging cable to the external power supply, the method comprising:
storing usage history of the charging cable;
detecting a usage state of the charging cable based on a control signal exchanged between the charging cable and the vehicle;
setting the control signal to an oscillating signal upon detecting that the first coupler and the second coupler are connected to the vehicle inlet and the external power supply respectively;
updating the usage history based on the detected usage state;
determining whether a service life limit of the charging cable has been exceeded based on the stored usage history and a reference value; and
limiting charge of the vehicle when it is determined that the service life limit has been exceeded by sending a command to stop oscillation of the control signal.

9. The method according to claim 8, further comprising:
displaying an indication that the service life limit is exceeded when it is determined that the service life limit has been exceeded.

10. The method according to claim 8, wherein the usage state of the charging cable includes at least one of a connection state of the first coupler, a connection state of the second coupler, and a charging state of the vehicle.

11. The method according to claim 10, wherein the detecting of the usage state includes detecting the connection state of the first coupler, the connection state of the second coupler, and the charging state of the vehicle based on the control signal.

12. The method according to claim 11, wherein the control signal is a standardized signal that is generated when the second coupler is connected to the external power supply, and set to a predetermined electric potential when the first coupler is connected to the vehicle inlet.

13. The method according to claim 11, wherein
the control signal is a standardized signal,
the oscillating signal has a duty cycle that corresponds to a current-carrying capacity of the charging cable, and
the amplitude of the oscillating signal changes from a first amplitude to a second amplitude when the oscillating signal is generated, and charging of the electric storage device by power from the external power supply starts when the amplitude of the standardized signal has changed to the second amplitude.

* * * * *